United States Patent
Osawa et al.

Patent Number: 5,481,996
Date of Patent: Jan. 9, 1996

[54] SPEED-INCREASED SMALL BOAT

[76] Inventors: Masakazu Osawa; Hidemori Osawa, both of 34-14, Kameido 9-chome, Koto-ku, Tokyo-to, Japan

[21] Appl. No.: 161,750

[22] Filed: Dec. 3, 1993

[30] Foreign Application Priority Data

Dec. 4, 1992 [JP] Japan ................... 4-350163

[51] Int. Cl.⁶ .................................. B63B 1/34
[52] U.S. Cl. .................................. 114/67 R
[58] Field of Search ............. 114/67 R, 271, 114/291, 140

[56] References Cited

U.S. PATENT DOCUMENTS

| | | | |
|---|---|---|---|
| 632,738 | 9/1899 | O'Hara | 114/67 R |
| 1,805,131 | 5/1931 | Donaldson . | |
| 2,969,760 | 1/1961 | Eddy | 114/291 |
| 3,111,923 | 11/1963 | Eddy | 114/291 |
| 3,117,544 | 1/1964 | Schoell | 114/291 X |
| 5,088,433 | 2/1992 | Osawa et al. | 114/67 R |

FOREIGN PATENT DOCUMENTS

| | | |
|---|---|---|
| 514924 | 6/1980 | Australia . |
| 290171 | 11/1988 | European Pat. Off. . |
| 1053535 | 2/1954 | France . |
| 1960204 | 6/1971 | Germany . |
| 48-35557 | 10/1973 | Japan . |
| 55-15349 | 4/1980 | Japan . |
| 60-33185 | 2/1985 | Japan . |
| 922199 | 3/1963 | United Kingdom . |
| 1014698 | 12/1965 | United Kingdom . |

*Primary Examiner*—Sherman Basinger
*Attorney, Agent, or Firm*—Wyatt, Gerber, Burke & Badie

[57] ABSTRACT

The speed of a high-speed powered boat such as high-speed fisherboats can be increased even at the same power output of the engine irrespective of the speed by providing on each side symmetrically with a plural number of fins each opening outwardly toward the rear end making an angle with the boat hull in at least two high and low rows along the waterline which varies depending on the speed of the boat, whereby the wave-making resistance against the boat is greatly reduced at varied speed of the boat along with a stabilizing effect to decrease rolling. The effect of wave-making resistance suppression can be further enhanced by providing the bow of the boat with a stem-edge guard with right and left wings opening outwardly toward the side lines.

4 Claims, 4 Drawing Sheets

SPEED-INCREASED SMALL BOAT

BACKGROUND OF THE INVENTION

The present invention relates to a speed-increased small powered boat such as racing boats, high-speed fisherboats, motorboats for sportfishing and the like. More particularly, the invention relates to a means to increase the speed of a small powered boat, which proceeds at such a high speed that the waterline of the boat body varies depending on the speed of the boat, by suppressing the wave-making resistance.

Needless to say, any ships or boats proceeding afloat on the surface of water produce waves so that a major portion of the energy output of the engine is lost against the wave-making resistance so that the maximum speed of the vessel is limited thereby since the wave-making resistance is rapidly increased as the speed of the vessel is increased.

The wave-making resistance here implied is the resistance caused by a gravity wave produced as a result of proceeding of a vessel afloat. The most important factor affecting the wave-making resistance is the so-called Froude number which is a hydrodynamical parameter as the ratio of the force of inertia and the gravity.

Accordingly, it is natural that the wave-making resistance could be decreased when the gravity of the vessel per se is decreased. In this regard, various attempts and proposals have been made in the prior art. For example, a proposal is made in Japanese Patent Publications 55-15349 and 48-35557, according to which the ship hull is provided with a large number of air-jet openings or holes on or near the ship bottom and compressed air is ejected therefrom into the water to form bubbles therein so that the ship body receives an increased buoyant force.

Setting aside submarine boats having no free surface which proceed with the body entirely submerged, this method of bubble formation in water has no effect to decrease the wave-making resistance without reducing occurrence of waves due to proceeding of the ship afloat on the water surface. Moreover, the ship running on the mass of bubbles is under a risk of eventual capsizing when the speed thereof exceeds a certain upper limit. Therefore, this method of air-jet bubbling is not practical if not to mention the cost therefor.

Alternatively, Japanese Patent Kokai 60-33185 proposes a method in which compressed air is ejected into the water in front of the proceeding ship to produce a water mass containing numberless bubbles by which the ship receives a decreased resistance from water. This method is also not practical because of the great investment for the air compressor and other accessories for ejecting compressed air as well as the very large energy consumption for the ejection of the compressed air against water pressure.

The inventors have previously proposed, in U.S. Pat. No. 5,088,433, a simple but very efficient means to suppress the wave-making resistance on a ship body proceeding afloat. Namely, the wave-making resistance on a proceeding ship can be greatly decreased by providing the ship hull with at least one pair of fins mounted on the hull surface at symmetrical positions each extending above and below the waterline, each fin being fixed to the ship hull at the front end line thereof without leaving a gap opening therebetween and the rear end of the fin outwardly extending to make a specified fin-mounting angle with the hull surface.

This means is indeed very effective when the fins are installed on the ship hull of a relatively large vessel of which the depth of the waterline little depends on the speed of the vessel. When this means is applied to a relatively small powered boat of high speed such as racing boats, however, the effect of wave-making resistance suppression is not always quite satisfactory since the depth and direction of the waterline are greatly changed depending on the speed of the boat.

SUMMARY OF THE INVENTION

The present invention accordingly has an object to provide a novel and efficient means to decrease the wave-making resistance working on a boat proceeding at a high speed, of which the depth and direction of the waterline are subject to changes depending on the speed of the boat, regardless of the speed of the boat up to the highest speed.

Thus, the present invention provides a high-speed powered boat which is provided on the side surfaces of the boat hull, symmetrically relative to the centerline of the keel on the boat bottom, with a plural number of fins, each fixed along the front end line thereof to the side surface of the boat hull without leaving a gap opening therebetween and the rear end thereof outwardly extending to make a specified fin-mounting angle with the hull surface, arranged in at least two rows on each of the side surfaces of the boat hull, each of the fins in the uppermost row extending above and below the waterline made when the boat is stationary or proceeding at an intermediate speed up to the highest and each of the fins in the lowermost row extending above and below the waterline made when the boat is proceeding at the highest speed.

Further, an additional advantage is obtained by providing a stem edge guard, which outwardly extends toward the stern to make an angle with each of the side surfaces of the boat body, along the stem edge between the points corresponding to the waterlines when the boat is proceeding at the highest speed and when the boat is stationary or proceeding at an intermediate speed up to the highest speed.

DETAILED DESCRIPTION OF THE PREFERRED EMBODIMENTS

As is defined above and illustrated in the accompanying drawing, the high-speed powered boat of the present invention is characterized by a plural number of fins provided on the side surfaces of the boat hull, symmetrically relative to the centerline of the keel on the boat bottom, each fin being fixed along the front end line thereof to the side surface of the hull without leaving a gap opening therebetween and the rear end of the fin outwardly extending to make a specified fin-mounting angle with the hull surface, arranged in at least two rows on each of the side surfaces of the boat hull, each of the fins in the uppermost row extending above and below the waterline made when the boat is stationary or proceeding at an intermediate speed up to the highest and each of the fins in the lowermost row extending above and below the waterline made when the boat is proceeding at the highest speed.

Figure 1:
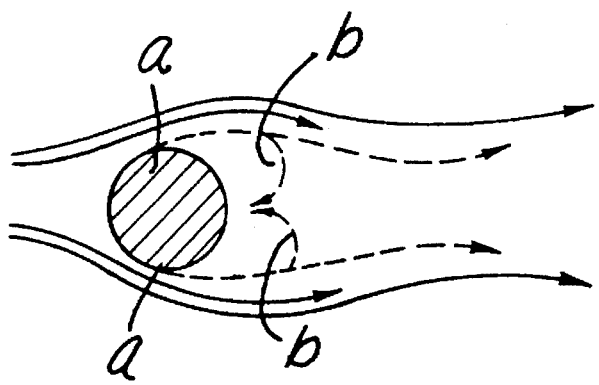
FIG. 1 illustrates the flow line of a water stream around a stationary body held in the stream.
Figure 2:
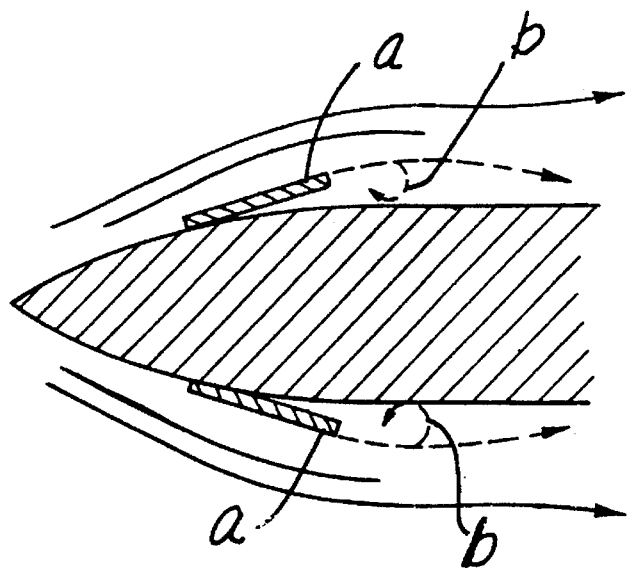
FIG. 2 illustrates the flow line of water along a pair of fins on a boat body according to the invention.

According to the hydrodynamics, as is well known, any actual fluid has viscosity and compressivity so that, when a body is held in a stream of a fluid, the viscosity of the fluid causes a velocity distribution in the fluid due to the wall-surface friction and, as is shown in FIG. 1, a break-away portion "a" and back-wash portion "b" are formed in the flow line pattern around the body. The situation is similar when the fluid is stationary and the body therein is moved. This fact has led to the improvement proposed in U.S. Pat. No. 5,088,433 according to which, when a fin extending outwardly toward the rear end is provided on the side surface of the boat to extend above and below the waterline of the boat, as is illustrated in FIG. 2, a break-away portion "a" is formed at the rear end of the fin while a back-wash portion "b" is formed between the rear end of the fin and the surface of the body. As a consequence, the wave formed by the proceeding boat is converted into a turbulent flow as it passes the rear end of the fin resulting in quenching of the wave or suppression of the wave-making resistance.

When a plural number of pairs of such fins are provided symmetrically on the side surfaces along the waterline from the bow to the stern, the wave-making resistance caused by navigation of the boat on water can be stepwise suppressed by the successive pairs of the fins so that the boat can be freed from speed reduction due to the wave-making resistance to a considerable extent.

Figure 3:
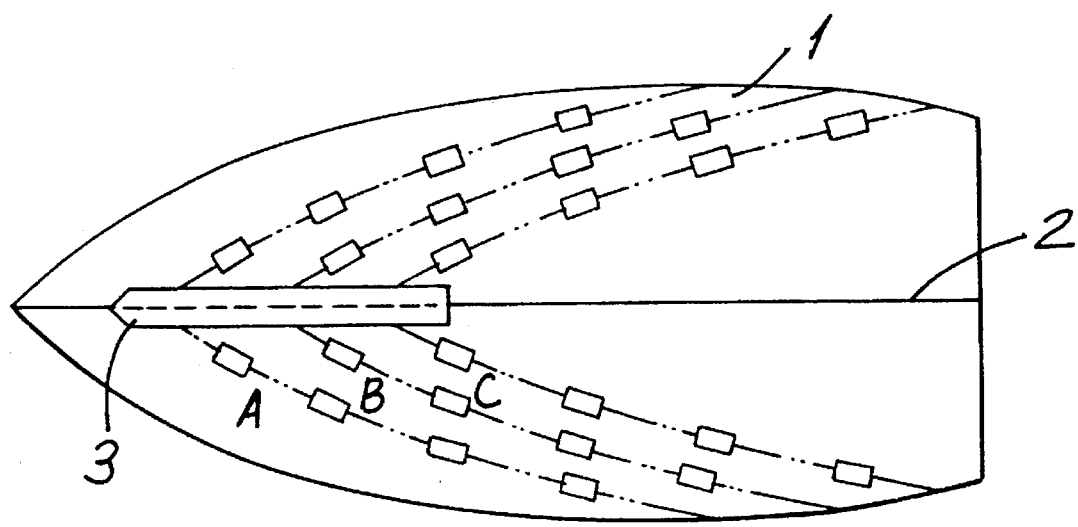
FIG. 3 is a plan view of the bottom of a boat showing three waterlines A, B and C on each side.

It is known, however, that the depth and direction of the waterline are subject to changes depending on the speed of the boat, especially, when the boat is a relatively small boat of very high speed such as racing boats, high-speed fisher-boats, motorboats for sportfishing and the like. As is illustrated in FIG. 3, the waterline of the boat is deepest as is indicated by the chain line A, for example, when the boat is stationay while the waterline moves on the side surface 1 to the chain lines B to C symmetrically relative to the keel centerline 2 as the speed of the boat is increased, usually, with the bow of the boat raised relative to the stern. Accordingly, a pair of fins installed on both side surfaces of a boat along a single waterline indicated, for example, by the chain line A would no longer be effective when the boat is navigating at a high speed.

Figure 4:
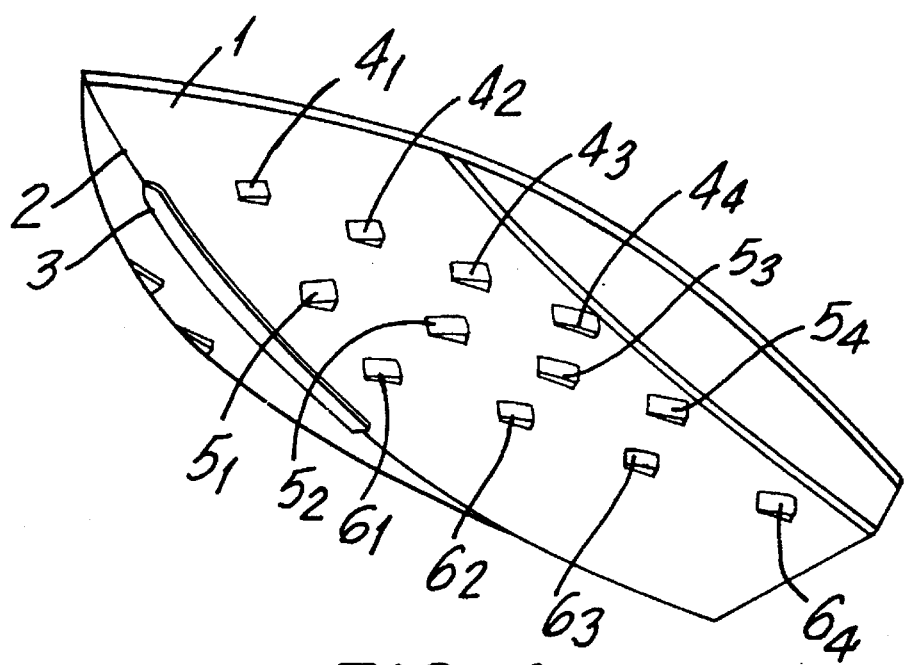
FIG. 4 is a perspective bottom view of a boat according to the invention provided with three rows of fins on each side and a stem edge guard.

In this regard, the present invention proposes to provide pairs of fins in at least two rows, or in three rows in FIG. 4 including the fins $4_1$, $4_2$, $4_3$ and $4_4$ in the uppermost row, $5_1$, $5_2$, $5_3$ and $5_4$ in the second row and $6_1$, $6_2$, $6_3$ and $6_4$ in the lowermost row, of which each row is along a waterline A, B or C in FIG. 3 being changed depending on the speed of the boat. Preferably, each of the fins in the lowermost row extends above and below the waterline made when the boat is proceeding at the highest speed. On the other hand, the uppermost row need not correspond to the stationary waterline of the boat but can be along a waterline when the boat is proceeding at an intermediate speed up to the highest because the advantage obtained by providing the fins according to the invention is relatively small when the boat is proceeding at a low speed. Assuming that the highest speed of the boat is 50 knots, for example, the lowermost row of the fins $6_1$, $6_2$, $6_3$ and $6_4$ is preferably along the waterline which is made when the boat logs 50 knots but the uppermost and the second rows each can be along the waterline when the boat is proceeding, for example, at 20 knots and 35 knots, respectively.

The form of each of the fins is not particularly limitative provided that the front end line thereof is curved to just fit the curved side surface of the boat hull on which the fin is mounted. For example, the fin can be square, rectangular, trapezoidal, triangular, pentagonal semicircular, sector-formed and the like. The material of the fins is also not limitative including metals, plastics, woody materials, ceramics and the like if a mechanical strength as desired can be obtained therewith. The dimensions of each fin are selected depending on various factors including the size of the boat, expected highest speed of the boat and so on. As an example, a rectangular fin may have a vertical length of 10 to 50 cm and a horizontal length of 15 to 70 cm.

Figure 5A:
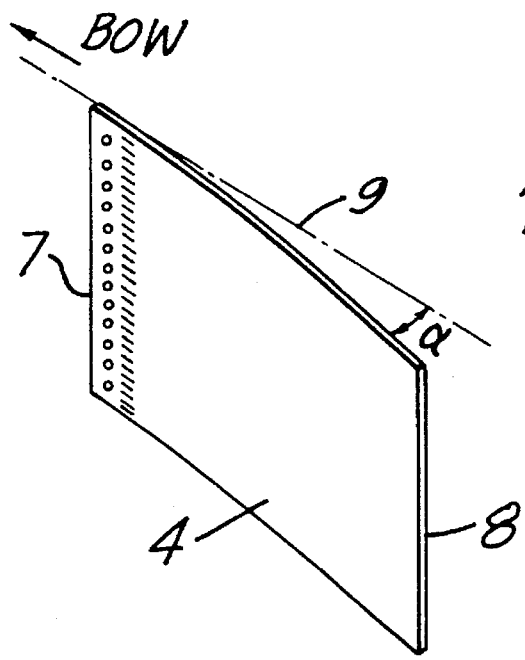
FIG. 5a, 5b and 5c are each a perspective view of a single fin.
Figure 5B:
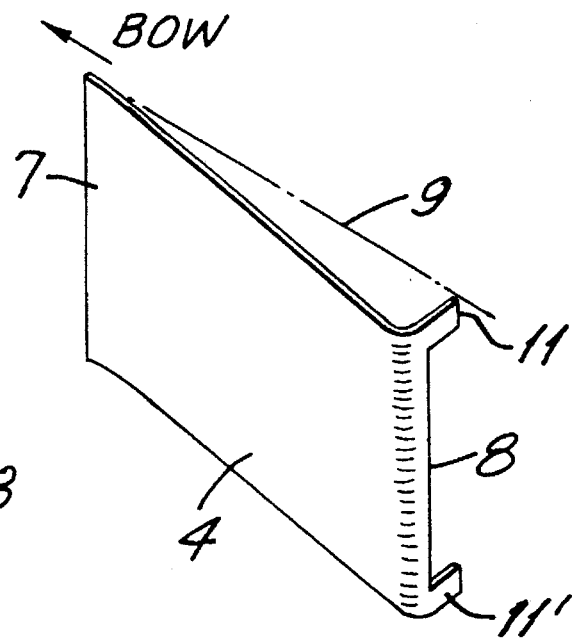
Figure 5C:
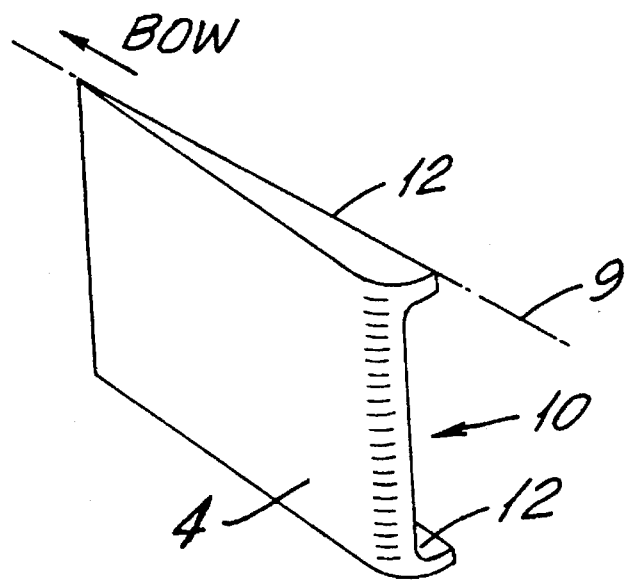

FIGS. 5a, 5b and 5c each illustrate the mounting fashion of a rectangular fin 4 on the boat hull 9. As is illustrated in FIG. 5a, the rectangular fin 4 is fixed in a cantilever fashion to the boat hull 9 by rivetting along the front end line 7 while the body of the fin 4 extends outwardly toward the rear end making an angle α therewith so that the rear end line 8 of the fin 4 is apart from the hull surface 9. The angle α is in the range from 2° to 25° or, preferably, from 5° to 15°. In FIG. 5b, the rear end 8 of the fin 4 is extended portionwise at the upper and lower parts and the extended portions 11, 11' are bent and welded to the hull surface 9 like a stay member so as to obtain a reinforcing effect of fin mounting. In FIG. 5c, each of the gap openings formed between the upper and lower end lines of the fin 4 and the hull surface 9 is closed by providing a narrow triangular stay 12 making a pocket 10 between the fin 4 and the hull surface 9 so as to obtain a further increased reinforcing effect of fin mounting. It is sometimes advantageous to have such a design that the fin mounting angle α is variable.

Figure 6:
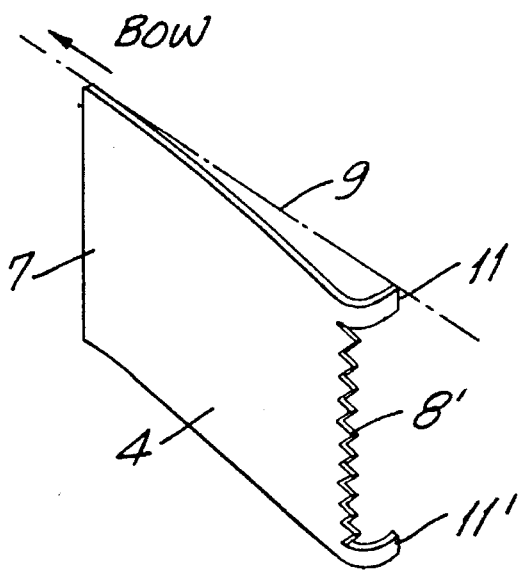
FIG. 6 is a perspective view of a single fin having a sawtoothed rear end line.

FIG. 6 illustrates a fin 4 similar to that illustrated in FIG. 5b. In this fin 4, the rear end line is not a straight line as in FIG. 5b but is shaped in a sawtoothed line 8' by which an additional advantage is obtained that the bubbles eventually formed along the rear end line 8' of the fin are divided so as to exhibit a rectifying effect against occurrence of a turbulent flow.

Figure 7:
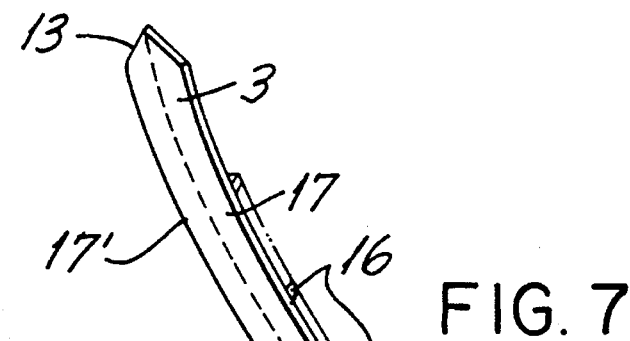
FIG. 7 is a perspective views of a stem edge guard demounted from the boat body.
Figure 7A:
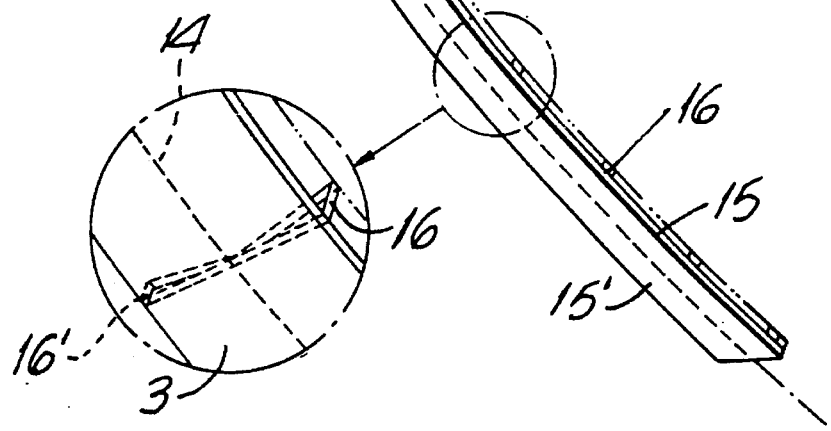
FIG. 7A is an exploded view of the circled portion of the stem edge guard shown in FIG. 7.

In addition to the rows of fins installed on the side surfaces of the boat body, an additional effect of wave-making resistance suppression can be obtained by providing the bow of the boat with a stem edge guard 3 as is illustrated in FIGS. 3 and 4 along the centerline 2 of the keel. FIG. 7 illustrates a perspective view of a stem edge guard 3 as demounted from the boat body. The stem edge guard 3 is an elongated plate bent along the centerline 14 to make left and right wings 17, 17' having a doglegged cross sectional configuration and fixed to the stem line of the boat at the upper end 13 and along the center line 14 symmetrically relative to the center line 2 of the boat keel reaching the waterline made when the boat is proceeding at the highest speed in such a fashion that the side lines 15, 15' are each apart from the side surface of the boat body. It is preferable for reinforcement of mounting that several stays 16, 16' are provided between the side lines 15, 15' of the stem edge guard 3 and the surface of the boat body. It is of course optional, in place of the separate stays 16, 16', to have the wings 17, 17' are extended portionwise and bent toward the body surface where the extended portions of the wings are fixed thereto by welding. It is of course optional that the wings 17, 17' are prepared as separate members and they are mounted individually to the stem of the boat.

The stem edge guard 3 should have a length sufficient to cover the range corresponding to the centerline 2 between the highest and lowest waterlines. The actual length and width thereof naturally depend on the size of the boat, for example, in the range from 2 to 10 meters for the length and from 10 to 50 cm for the width. It is preferable that the wings 17, 17' of the stem edge guard 3 extend outwardly such that each of the side lines 15, 15' is apart from the hull surface at a distance of 2 to 10 cm. If necessary, this distance between the side line 15 or 15' and the hull surface is gradually decreased from the front end toward the rear end.

When a small high-speed powered boat is provided with fins in a plural number of rows and with a stem edge guard according to the invention, a great effect of wave-making resistance suppression can be obtained irrespective of the speed of the boat so that the speed of the boat can be increased by 5 to 20% as compared with a conventional boat of the same model assuming the same power output of the engine. Alternatively, a considerable saving in the fuel cost can be obtained with the inventive boat as compared with a conventional boat of the same model proceeding at the same speed. Moreover, the boat according to the invention is advantageous in respect of the comfortableness of the crews and passengers on board since a stabilizing effect can be obtained in the boat according to the invention even on a stormy sea.

In the following, the inventive boat is described in more detail by way of examples.

EXAMPLE 1

A water tank test was undertaken with two model boats each having an overall length of 1 meter in a water tank of 10 meters by 5 meters wide. The two model boats floating at about the center part of the water tank in parallel with each other were each towed at the bow with a rope through a tension gauge in the direction along the longer side of the water tank.

One of the two model boats, the other being for control, was provided with 12 fins on each side in three up and down rows each with four fins as is illustrated in FIG. 4. The fins were made from a 2 mm thick plate of a polyvinyl chloride resin and had a vertical length of 4 cm and a horizontal length of 5 cm. The foremost fins in the uppermost, middle and lowermost rows were fixed to the hull surface at such positions that the front end lines of the respective fins were 15 cm, 30 cm and 45 cm, respectively, apart horizontally from the bow head. The rear end line of each fin was 0.5 cm apart from the hull surface so that the fin mounting angle was 6°. In each of the rows, the four fins were fixed to the hull surface with a pitch of 25 cm. The fins of the uppermost row were fixed to the hull surface along the waterline of the model boat when the boat is stationary on the water surface while the fins of the second and lowermost rows were fixed along such waterlines 6 cm and 13 cm, respectively, below the stationary waterline.

Separately, the same model boat was provided with a stem edge guard having a length of 45 cm and a width of 3 cm along the centerline between the points apart from the head of the bow by 5 cm and 50 cm. The distance between each side line of the stem edge guard and the hull surface was 0.5 cm all over the whole length thereof.

A parallel water stream was generated by means of a water-jet pump in the water tank in the direction from the bow to the stern of the towed model boats at varied flow velocities and the tension load on the towing ropes was determined by means of the tension gauge. The results are shown in Table 1.

TABLE 1

| Water stream velocity, | Load, kg | |
|---|---|---|
| meter/second | with fins | no fins |
| 3.0 | 1.1 | 2.1 |
| 4.0 | 1.6 | 2.4 |
| 5.0 | 2.2 | 3.0 |
| 6.0 | 2.5 | 3.8 |

EXAMPLE 2

A real boat test was undertaken as a control with a motorboat (Model Yamaha SR-21) having an overall length of 6.65 meters and an overall width of 2.41 meters and weighing 820 kg equipped with an outboard engine of 220 horsepower. On a still-water area of the sea under the oceanographic conditions of a wind velocity of 0.5 m/second (1.1 miles/hour) and a wave height of 10 cm, the boat was driven at the full engine output repeatedly back and forth between 300 meters apart posts and the times taken for the 300 meters runs were recorded to calculate the average speed of the boat, which was 39 knots.

Similarly to the model boat test in the water tank described above, the motorboat was provided with 12 fins on each side in three rows each with four fins as is illustrated in FIG. 4. The fins were made from a 3 mm thick steel plate and had a vertical length of 18 cm and a horizontal length of 22 cm. The foremost fins in the uppermost, middle and lowermost rows were fixed to the hull surface at such positions that the front end lines of the respective fins were 1.5 meters, 2.0 meters and 2.5 meters, respectively, apart horizontally from the bow head. The rear end line of each fin was 1.0 cm apart from the hull surface so that the fin mounting angle was 3°. In each of the rows, the four fins were fixed to the hull surface with a pitch of 60 cm. The fins of the uppermost row were fixed to the hull surface extending above and below the waterline of the boat when the boat is stationary on the water surface while the fins of the second and lowermost rows were fixed extending above and below such waterlines 20 cm and 30 cm, respectively, below the stationary waterline.

Further, the bow of the boat was provided with a stem edge guard having a length of 150 cm and a width of each wing of 22 cm mounted thereon with the front end thereof at a position of 50 cm apart from the bow head. The stem edge guard had such an opening angle that each of the side lines thereof was 1.5 cm apart from the hull surface.

The motorboat thus provided with the fins and the stem edge guard was subjected to the running test in the same manner as above to find that the highest velocity was 44 knots. In addition, a remarkable decrease is noted in rolling of the boat indicating a stabilizing effect obtained according to the invention.

What is claimed is:

1. A high-speed powered boat which is provided on the side surfaces of the boat hull, symmetrically relative to the centerline of the keel on the boat bottom, with a plural number of fins, each being fixed at the front end line thereof to the side surface of the boat hull without leaving a gap opening therebetween and the rear end thereof outwardly extending making an angle with the hull surface, arranged in at least two rows on each of the side surfaces of the boat hull, each of the fins in the uppermost row extending above and below the waterline made when the boat speed is from 0 to intermediate speed and each of the fins in the lowermost row extending above and below the waterline made when the boat is proceeding at the highest speed.

2. The high-speed powered boat as claimed in claim 1 which is further provided with a stem edge guard, which outwardly extends toward the stern making an angle with each of the side surfaces of the boat body, along the stem edge between the points corresponding to the waterlines when the boat is proceeding at the highest power output of the engine and when the boat speed is from 0 to the highest speed.

3. The high-speed powered boat as claimed in claim 1 in which each of the fins has a sawtooth-formed rear end line.

4. The high-speed powered boat as claimed in claim 1 in which the angle made between the hull surface and each of the fins in a row is varied to successively decrease from the foremost fin to the rearmost fin in the row.

* * * * *